(12) United States Patent
Perlman et al.

(10) Patent No.: US 11,989,158 B2
(45) Date of Patent: May 21, 2024

(54) MAINTAINING RETENTION POLICIES IN A BLOCK STORAGE, MULTI-CLIENT DEDUP DOMAIN

(71) Applicant: EMC IP Holding Company LLC, Hopkinton, MA (US)

(72) Inventors: Radia J. Perlman, Redmond, WA (US); Kalyan C. Gunda, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 452 days.

(21) Appl. No.: 17/160,783

(22) Filed: Jan. 28, 2021

(65) Prior Publication Data

US 2022/0237148 A1 Jul. 28, 2022

(51) Int. Cl.
*G06F 7/00* (2006.01)
*G06F 9/54* (2006.01)
*G06F 16/11* (2019.01)
*G06F 16/174* (2019.01)
*G06F 16/176* (2019.01)

(52) U.S. Cl.
CPC ............ *G06F 16/125* (2019.01); *G06F 9/547* (2013.01); *G06F 16/1748* (2019.01); *G06F 16/176* (2019.01)

(58) Field of Classification Search
CPC .. G06F 16/125; G06F 16/176; G06F 16/1748; G06F 9/547; G06F 3/0608; G06F 3/0641; G06F 3/067

USPC .......................... 707/662, 609, 692, 640, 693
See application file for complete search history.

(56) References Cited

U.S. PATENT DOCUMENTS

| | | | |
|---|---|---|---|
| 8,650,159 B1* | 2/2014 | Zhang ................. | G06F 11/1464 707/696 |
| 8,700,578 B1* | 4/2014 | Varadan ............... | G06F 16/174 707/692 |
| 8,793,226 B1* | 7/2014 | Yadav ................. | G06F 16/1748 707/693 |
| 8,930,306 B1* | 1/2015 | Ngo ..................... | G06F 16/178 707/625 |
| 2010/0094817 A1* | 4/2010 | Ben-Shaul ........... | G06F 16/1752 707/697 |
| 2011/0016091 A1* | 1/2011 | Prahlad ............... | G06F 11/1453 707/654 |

(Continued)

*Primary Examiner* — Md I Uddin
(74) *Attorney, Agent, or Firm* — Workman Nydegger (57) ABSTRACT

One example method includes maintaining a deduplication data structure including one or more entries that each identify a respective fingerprint, and pointer, and also maintaining a ClientBlockList data structure comprising one or more entries that each identify a respective handle, retention date, and block, receiving a write request that identifies a handle, retention date, and block, computing a fingerprint of the block identified in the write request, determining, by the server, whether the fingerprint is in the deduplication data structure, and when the fingerprint is not in the deduplication data structure, storing the block identified in the write request at location 'L' in the deduplication data structure, and adding, to the deduplication data structure, an entry that identifies the fingerprint and the location 'L,' and adding, to the ClientBlockList data structure, an entry that identifies the handle, retention date, and fingerprint.

15 Claims, 4 Drawing Sheets

(56) References Cited

U.S. PATENT DOCUMENTS

| | | | | |
|---|---|---|---|---|
| 2012/0124012 A1* | 5/2012 | Provenzano | ........ | G06F 16/1748 |
| | | | | 707/E17.005 |
| 2012/0124014 A1* | 5/2012 | Provenzano | ........ | G06F 16/1748 |
| | | | | 707/E17.005 |
| 2012/0323860 A1* | 12/2012 | Yasa | ................... | G06F 16/1748 |
| | | | | 707/E17.005 |
| 2013/0325821 A1* | 12/2013 | Amit | ................... | G06F 16/1748 |
| | | | | 707/E17.005 |
| 2014/0101113 A1* | 4/2014 | Zhang | ................. | H04L 67/5681 |
| | | | | 707/E17.002 |
| 2014/0181376 A1* | 6/2014 | Miyamoto | .......... | G06F 12/0246 |
| | | | | 711/103 |
| 2017/0091183 A1* | 3/2017 | Kenchammana-Hosekote | ............ | |
| | | | | G06F 16/9535 |
| 2018/0253255 A1* | 9/2018 | Jain | ....................... | G06F 3/0673 |

\* cited by examiner

MAINTAINING RETENTION POLICIES IN A BLOCK STORAGE, MULTI-CLIENT DEDUP DOMAIN

FIELD OF THE INVENTION

Embodiments of the present invention generally relate to data retention, such as in a storage system. More particularly, at least some embodiments of the invention relate to systems, hardware, software, computer-readable media, and methods for maintaining data retention while also enabling data deduplication.

BACKGROUND

Some storage systems such as file systems and object stores allow specification of a retention date for stored data. Other storage systems, such as block storage systems, may perform data deduplication at a block level. However, conventional storage systems do not specify different retention dates for data blocks, while also ensuring that only a single copy of each data block is retained. In fact, combining such functionalities may be counterintuitive.

For example, if two copies of the same data block in storage have different respective retention dates, retention date logic might suggest that the copy, or instance, of the data block with the latest retention date should be retained until its respective retention date has arrived. On the other hand, dedup logic might suggest that since there are two copies of the same data block, it is only necessary to retain one of the copies. Thus, the retention logic and dedup logic would appear to allow for the possibility of different respective outcomes in some circumstances.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data retention, such as in a storage system. More particularly, at least some embodiments of the invention relate to systems, hardware, software, computer-readable media, and methods for maintaining data retention while also enabling data deduplication.

In general, example embodiments of the invention may enable a client to assign a "retention date" to client data that is to be stored at a storage server or other storage site. The retention date may be assigned, for example, to an entire file or to a portion of a file. Because the file, or file portion, may comprise a number of data blocks, or simply 'blocks,' the retention date may thereby extend to all the blocks that make up the file, or file portion. Regardless of the level at which the retention date may be assigned by the client, embodiments of the invention embrace a storage system that manages client data deduplication and client data retention at the block level. In particular, the storage system only maintains a single copy of a block, even though that block might have duplicates with different retention dates. As such, example embodiments of the invention embrace approaches that may achieve both deduplication, which may be referred to herein with the shorthand notation 'dedup,' while also enabling the storage system to get rid of a block when all instances of that block have passed the retention date. For example, data blocks should be dedupable even if their respective retention dates are different. As well, a data block should not be deleted until the date on the instance of the block with the latest retention date has elapsed.

It might be possible to place the burden of deleting files on the client that keeps the file system. However, a client may no longer exist after having stored the data, or the client might log in only seldomly, if at all. So it is useful for the block storage back end system to be able to know when blocks can be deleted, that is, when all copies of that block have reached their retention date. Moreover, although a client machine may take notice when a file or object has reached its retention date, and then explicitly delete all the blocks, example embodiments of the invention may enable a storage server to be able to identify a block that can safely be deleted, because all the files/clients that include that block have reached their respective retention dates. In this way, the storage server may be able to discard blocks even if some clients are not online, or are not bothering to garbage-collect the file system to delete data that has reached its retention date.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

In particular, one advantageous aspect of at least some embodiments of the invention is that data blocks may be dedupable even if their respective retention dates are different. In an embodiment, a data block may not be deleted until the date on the instance of the block with the latest retention date has elapsed. In an embodiment, the seemingly conflicting, at times, aims of deduplication and retention may be reconciled.

It is noted that embodiments of the invention, whether claimed or not, cannot be performed, practically or otherwise, in the mind of a human. In connection with the illustrative examples disclosed herein, embodiments of the invention are applicable to, and find practical usage in, environments in which large datasets, such as datasets measured in MB, GB, TB, or PB, for example, may be processed and evaluated in a data storage system. Such handling and processing is well beyond the mental capabilities of any human to perform practically, or otherwise. Thus, where simplistic examples are disclosed herein, those are only for the purpose of illustration and to simplify the discussion. As noted above, real world applications may involve chunking files into a large number of blocks, assigning retention dates to the blocks, deduplicating the blocks, and storing the blocks. Such processes must be performed relatively quickly, and accurately. Accordingly, nothing herein should be construed as teaching or suggesting that any aspect of any embodiment of the invention could or would be performed, practically or otherwise, in the mind of a human.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations including, but not limited to, data read/write/delete operations, data retention operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Figure 1:
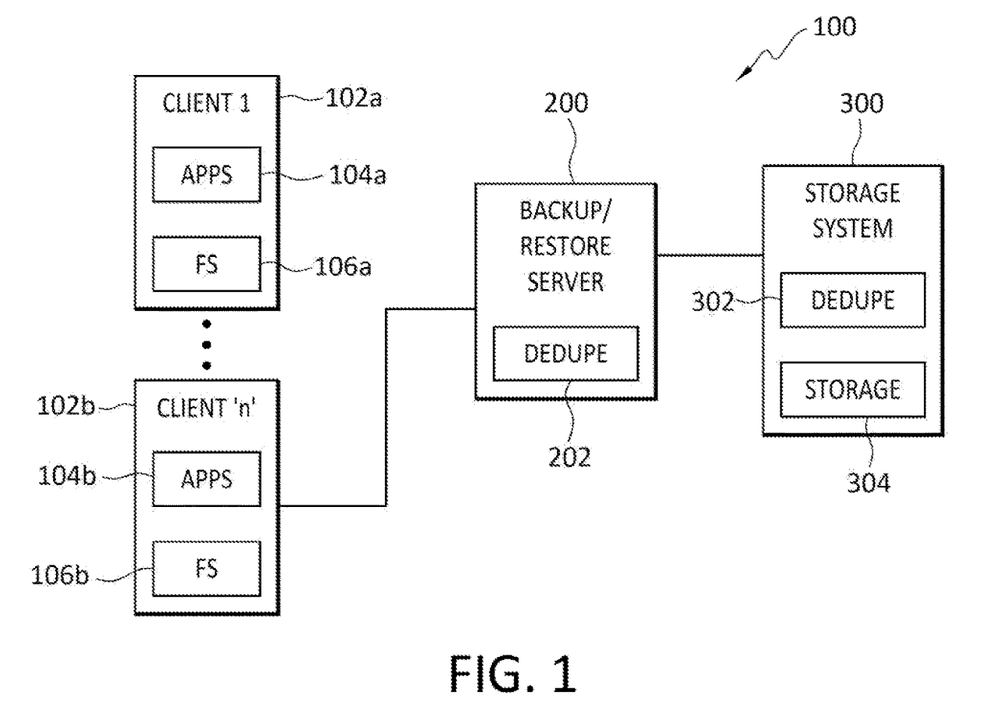
FIG. 1 discloses aspects of an example operating environment for some embodiments.

With particular attention now to FIG. 1, one example of an operating environment for embodiments of the invention is denoted generally at 100. As discussed in more detail below, example environments may include one or more clients that generate data that is stored in a storage system.

In general, client applications may store unstructured data in the form of files, and a filesystem stores that data in a storage system as blocks. The storage system may be used by many different applications/filesystems referred to as clients, and the storage system stores data in blocks and provides deduplication of all data that is stored across all clients, and the storage system may also provide retention time capability for the stored blocks. Data deduplication reduces storage requirements and also provides a way to manage data retention efficiently. In some instances at least, the client may be completely unaware as to how the storage system is managing deduplication and retention at its end, that is, at the storage system end.

As shown in FIG. 1, the operating environment 100 may include one or more clients such as clients 102a and 102b. The clients 102a and 102b may be in the same dedup domain, although that is not necessarily required and, in other embodiments, the clients 102a and 102b may be in different respective dedup domains.

Each of the clients 102a and 102b, may have a respective set of one or more applications 104a and 104b, each of which may generate new and modified data. Data generated by the applications 104a and 104b may be used by a backup/restore server 200 to create backups that may then be stored in, and restored from, a storage system 300. Any one or more of the clients 102a and 102b may comprise a file system 106a and 106b accessible by a user to perform operations on files, and the file system 106a and 106b may present a user interface (UI) to a user to enable the user to perform such operations.

In some embodiments, deduplication of data that is to be backed up may be performed by dedup logic 202 at the backup/restore server 200. Additionally, or alternatively, deduplication of data that is to be backed up may be performed by dedup logic 302 of the storage system 300, and the deduped data then stored in storage 304. Further details concerning the operation of elements disclosed in FIG. 1 are provided below.

B. Overview

With the discussion of FIG. 1 in view, further details are provided concerning various elements disclosed in that Figure. In general, the system referred to herein as the "client," or the "file system," may maintain some sort of structure on its data. Although referred to as a file system in some implementations, that structure could also be, for example, a database. A client, such as one of the clients 102a and 102b, for example, may partition a file, such as may be generated by an application, such as applications 104a and 104b, into blocks. The blocks need not be of fixed lengths. For maximum dedup capability, some client systems may perform variable chunking in which blocks may have different respective lengths. If there are multiple clients in the same dedup domain, those clients may use similar strategies for chunking files into blocks. If those clients do not use similar strategies, an error will likely not occur, but it may be the case that fewer blocks will dedup. There may also be a backend storage system, such as the storage system 300, that may include a block interface. This may be referred to as the "server" or "storage system." An API (application program interface) between the client and server is responsible for writing and reading blocks.

A user, such as a user at a client for example, may see and interact with a file system. The file system may partition a file into chunks, which may be referred to herein as "blocks." The storage system may store the blocks. Embodiments of the invention are operable in a mode where the client machine that converts the file interface into a block interface, and/or in a mode where the server converts the file interface into a block interface.

Example embodiments may implement various functionalities and features. For example, metadata comprising a retention date may be associated with a file, object, or block, for example. As another example, a client may explicitly delete a file when the retention date for that file has passed, but embodiments of the invention may not depend on the client to do that. Further, a server may perform a dedup process on blocks so that the server only keeps a single copy of a block, even if multiple instances of that block have different respective retention dates. Thus, the dedup process may be performed without any reference to the respective retention dates of the blocks involved in the dedup process. In some embodiments, the dedup process may be performed solely based on the block contents. Finally, a client may change the retention date on the data, so long as the retention date the client had previously asserted for that data has not passed at the time that the retention date is changed.

B. User Interface and File System

As noted above, embodiments of the invention may be implemented in connection with a configuration in which a user may interact with a file system. The user may read or write any portion of a file or files, optionally select or modify the retention date associated with the file or portion of a file, and delete a file. After the retention date of a file has passed, the storage system may be free to discard any blocks in that file, though some of the blocks might need to still be retained, because those blocks have been deduped with blocks with later retention dates, by a different file from that same client, or by a different client, for example.

As used herein, "retention date" indicates that the file must not be deleted by the storage system until that date, though the use of a retention date may not require the storage system to delete the data immediately. At some point after the retention date, such as when a server performs a garbage collection process for example, the user may no longer see the file, or may get an error message such as "retention date for this data has passed and the data is no longer available."

In general, a file system may partition a file into variable-sized chunks, or blocks. The term "block" may refer to a chunk of data of a fixed size, such as about 4K bytes for example, but for the purposes of the present disclosure, at last some embodiments may operate in conjunction with blocks that are of variable lengths, that is, the data may be partitioned into variable sized chunks. One reason for this is to allow dedup to be more effective when there are many copies of a file, but some copies may have, for example, a different sized header. With a simplistic partition-on-fixed-sized boundaries scheme, adding a single byte to a file will cause the system not to recognize any dedup opportunities. But with more sophisticated schemes, storage systems may partition files or objects into chunks that will ultimately synchronize with other copies, to allow for storage savings due to recognition of duplicate blocks. With multiple clients in the same dedup domain, it may be desirable for those clients in that dedup domain to have similar strategies for chunking the data. If the clients have different respective chunking strategies, there is no confusion or loss of data, but more storage will be required because of fewer dedup opportunities.

The interface between the file system and the storage system may be a block interface. For the purposes of at least some embodiments of the invention, reference may be made to the file system as the "client" and to the storage system as the "server," although in some cases, both the file system and the storage system may be deployed on the same machine. More generally, no particular configuration and arrangement of a file system and storage system is required for any embodiment.

C. Client/Server Operations—Read/Write

In general, the server may typically, or only, interact with clients using a block interface, so it may be irrelevant in some embodiments whether the client is managing an object store, a database, or a file system. A client may manage mapping from its own virtual storage into blocks. Each block may be assigned a "handle" by the client. The handle may be, for example, the beginning address in the virtual address space of the client for this block, or any other number guaranteed to be unique with respect to that client, for this block. No particular form of a handle is required however.

In other words, it would be acceptable for the client to use the handle "1" for the first block it stores, "2" for the next block, and so forth. Moreover, there is no confusion if client X chooses the same handle ID as client Y does, when Y is storing some other block. If client X stores a block with handle 71, for instance, client X can then read that block by asking the server to return "block with handle 71."

The client may chunk a file into blocks that may vary in size. The client may maintain metadata associated with a file that indicates, for example, where the block boundaries are, what the handle is for each block, as well as a retention date on the file as a whole. In some embodiments, a client may assign different respective retention dates to different parts of a file, such as individual blocks for example, rather than assigning a single retention date to an entire file. In any case, the client may then write each block to the server. The write may include, for example, the fields (handle, block). If the client wishes to specify a retention time, then the write may comprise the fields (handle, retention date, block). Again, the block may, or may not, be of variable length. One possible optimization, which may help to conserve network bandwidth, may involve the use of hashes. Particularly, a client might first specify a fingerprint, such as a hash for example, of the block, and the server may then indicate whether it needs to see the data associated with that fingerprint. If not, then the data need not be sent over the network.

C.1 Writing a Block

In some embodiments, a client may issue a write request to a server, where the write request takes the form 'Write (handle, retention date, block).' This request from the client may cause the server to compute the fingerprint of the block, and then add the entry (handle, retention date, fingerprint) to the ClientBlockList for that client. If an entry already exists with the same handle, the new entry may replace the existing entry. The DEDUP table may then be searched to see if the fingerprint specified in the entry to the ClientBlockList already exists or not. If that fingerprint already exists, a reference count may be decremented, where a reference count approach to block retention is being employed, or the Write operation may be considered as completed if a garbage collection approach to block retention is being employed. Following is one illustrative example of a write operation.

Client→server
Please write (handle, optional retention date, data)
( . . . or, if implementing the bandwidth-preserving optimization, the client may first send the hash, and only send the data if the server needs it . . . )
Client→server
(handle, optional retention date, h(data))
Client←server
Please send me the data for h(data)
Client→server
(h(data), data)

Note that if the client reuses a handle, such as '52' for example, and says "write (handle=52, [optional] retention date, data)," and there is already a block in ClientBlockList with handle 52, the old entry in the ClientBlockList for that client may be overwritten by the new entry.

C.2 Reading a Block

In some embodiments, if a user reads a portion of a file, the client, or file system, may then calculate, based on the file system metadata, which blocks need to be read. In general, a client may issue a read request to a server, where the read request may take the form: 'Read (handle).' In response to this read request, the server may search the ClientBlockList of that client for an entry that includes the specified handle, and if an entry '(handle)' is found in the ClientBlockList, the server may then locate the fingerprint in the DEDUP table, find the stored block to which the fingerprint corresponds, and then sent that block back to the client that issued the read request. In the event that the client is asking for data for which the retention time has passed and the server has deleted the data, the read request will fail with a corresponding error.

Following is an example of a process for reading a block. In this particular example, the client may then send to the server, and the server may reply to the client, for each block:

Client→server
Please read (handle)
Server→client
(handle, data)

D. Server Data Structures and Related Operations

Figure 2:
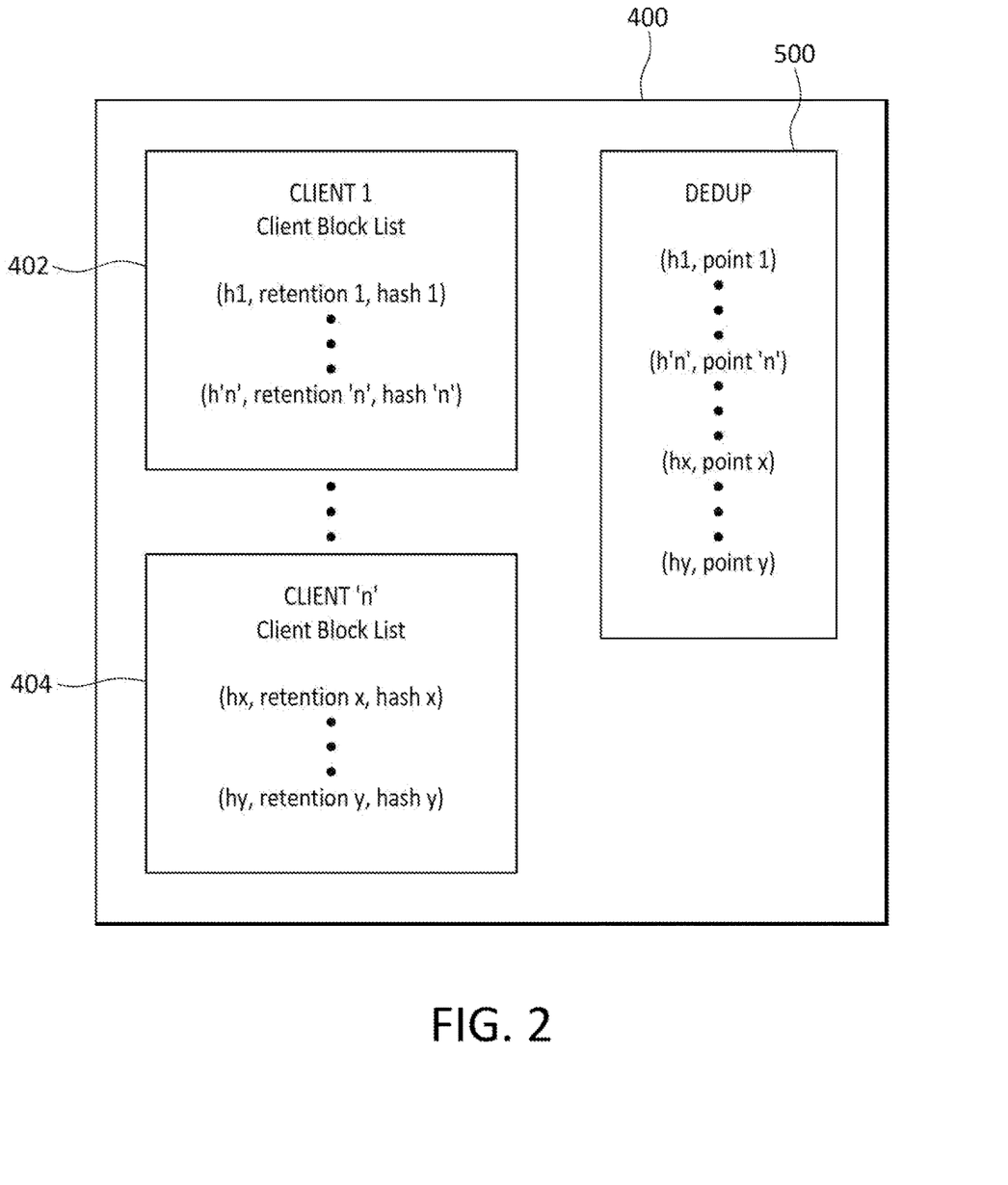
FIG. 2 discloses aspects of a server configuration according to some embodiments.

Embodiments of the invention may employ various server data structures, examples of which are disclosed in FIG. 2. For example, a server 400 may maintain one or more data structures 402 and 404, example embodiments of which may be referred to herein as a 'ClientBlockList.' In the example data structures 402 and 404, each of which may correspond to a respective client, the server may keep a respective list of entries, such as entries 1 to 'n' in the data structure 402 and entries X to Y in the data structure 404, where each entry in the list may comprise the information: handle, retention date, fingerprint [e.g., hash]. Each entry in the list may correspond to a different respective data block and, as such, the information in the entry may comprise, more specifically, the handle of the data block, the retention date assigned to that data block, and a fingerprint such as a hash, of that data block. Thus, for a hypothetical client X, the server 400 may have:

Client X ClientBlockList:
(handle1, retention date, hash), (handle2, retention date, hash), (handle3, retention date, hash), . . . }

More generally, the server 400 may have respective a ClientBlockList for any number of clients. As noted earlier herein, handle IDs may overlap, that is, may be common, between clients, without impairing the operation or functionality of example embodiments.

Another example data structure that may be employed by a server 400 in connection with some embodiments of the invention is a DEDUP table, an example of which is denoted at 500 in FIG. 2. The DEDUP table 500 may be kept by the server 400, and the DEDUP table 500 may be indexed by block hashes or, more generally, block fingerprints. Each entry in the DEDUP table 500, such as (h1, point1), may include a fingerprint such as 'h1,' and a pointer such as 'point1' that points to the physical place on a disk where the data associated with that fingerprint, or hash, is stored. Where reference counts are used as a basis for removing blocks from storage, an entry in the DEDUP table 500 may additionally include a reference count element and may take the example form (h1, point1, refcount 'n'). In at least some embodiments, and as shown in FIG. 2, the DEDUP table 500 encompasses all data and clients that are using the storage. In some cases, if storage provides multiple dedup domain based on characteristics such as performance, or SLA, for example, the DEDUP table 500 would group all those clients together belonging to that dedup domain.

As noted earlier, a client may read out a block by specifying, for example, the handle of that block. In more detail, and with continued reference to FIG. 2, if a client reads a portion of a file, the file system must determine which blocks in the file system need to be read, then look up, in the file system metadata, what the handles for those blocks are, and for each block, send to the server:

Client X→server

Please send me block with handle H.

In response to the client read request, the server 400 may look through the ClientBlockList 402 for Client 1, and find the entry (H, hash). Then the server 400 finds the "hash" in the DEDUP table 500, looks up where on disk the block with that hash is stored, reads the block, and returns the block to the client. In the example below, the data associated with the handle identified by the client is denoted 'D.'

Server→Client

The data associated with handle H is D.

If the server 400 does not see the block with handle 'H' in the ClientBlockList 402, possibly because the retention date of the block has passed and the server 400 already garbage collected the block, the server 400 might instead return an error message such as "no such block."

In some instances, a client may wish to change a retention date on a file, or a portion of a file, such as a block or group of blocks for example. In more detail, and with continued reference to FIG. 2, a particular Client X must identify all the blocks in the file or file portion, and for each block whose retention date is to be changed, send to the server:

Client→Server

Update retention date for these handles to this date:

({handle1, handle2, handle3, . . . handlek}, new retention date)

E. Server Enforcement of Retention Date

Servers, such as the example server 400, according to example embodiments may employ various mechanisms to enforce the retention dates of files and file portions such as data blocks, and thereby get rid of unused blocks. One such mechanism may be referred to as garbage collection, while another such mechanism may be referred to as reference counts.

In general, an example retention enforcement process may be performed in which the server periodically looks at each entry (handle, retention date, fingerprint) in the respective ClientBlockList for one or more clients. If a retention date specified in an entry has passed, then that entry may be deleted from the ClientBlockList. Where a garbage collection process is employed, the server may have completed its work at this point with respect to the entry. Where a reference count approach is employed, the server may, after deleting the entry from the ClientBlockList, find the corresponding entry in the DEDUP table 500 and decrement its reference count.

With more particular reference now to garbage collection, for each client X, the server may periodically sweep through the ClientBlockList for that client, and for each entry that specifies a retention date, such as (handle, retention date, hash), if the retention date has passed, the server may simply delete that entry from that particular ClientBlockList. The entry may, or may not, be deleted on the retention date. In some embodiments, the entry may be deleted at some point after the retention date.

In more detail, to perform garbage collection, the server may periodically go through all of the ClientBlockLists stored on the server and mark each block in the DEDUP table that is being pointed to by any entry in any ClientBlockList. Any unmarked blocks in the DEDUP table after this sweep of all the ClientBlockLists may be deleted from storage. As well, the vacated storage may be marked as free, and the corresponding entry in the DEDUP table may be removed.

Turning now to reference counts, the server may maintain, for each block in the DEDUP table, a reference count. When a client writes a block whose hash, or other block fingerprint, is already in the DEDUP table, the reference count for that block may be incremented. When an entry, such as (handle, hash), is deleted from a ClientBlockList of a client, for any reason, the reference count for that hash may be decremented. When an entry in the DEDUP table has a reference count of zero, that entry may be deleted from the DEDUP table, and the associated space where that block is stored may be marked as free.

F. Final Considerations

As will be apparent from this disclosure, example embodiments may implement various features and functionalities, although no particular embodiment is required to implement any of those. For example, some embodiments may provide a block storage API that may allow a client to specify a retention date on each block. As another example, a server or storage system according to example embodiments may keep a ClientBlockList data structure that lists, for each block of a client (handle, hash, retention date). In another example, a storage system according to example embodiments may periodically sweep through a respective ClientBlockList of one or more clients and remove entries from the ClientBlockList whose retention date has passed. An embodiment of the invention may embrace a block storage system configured to perform dedup operations with respect to blocks having respective retention dates. An embodiment may enable a client to specify a retention date when storing a block. An embodiment may enable a server to keep, for each client, a ClientBlockList that contains an optional retention date for the blocks of that client. An embodiment may enable a server to remove entries from the ClientBlockList that have reached the respective retention dates specified in those entries. Finally, an embodiment may provide for the creation and use of blocks with different respective expiration dates that may still dedup with each other.

G. Example Methods

Figure 3:
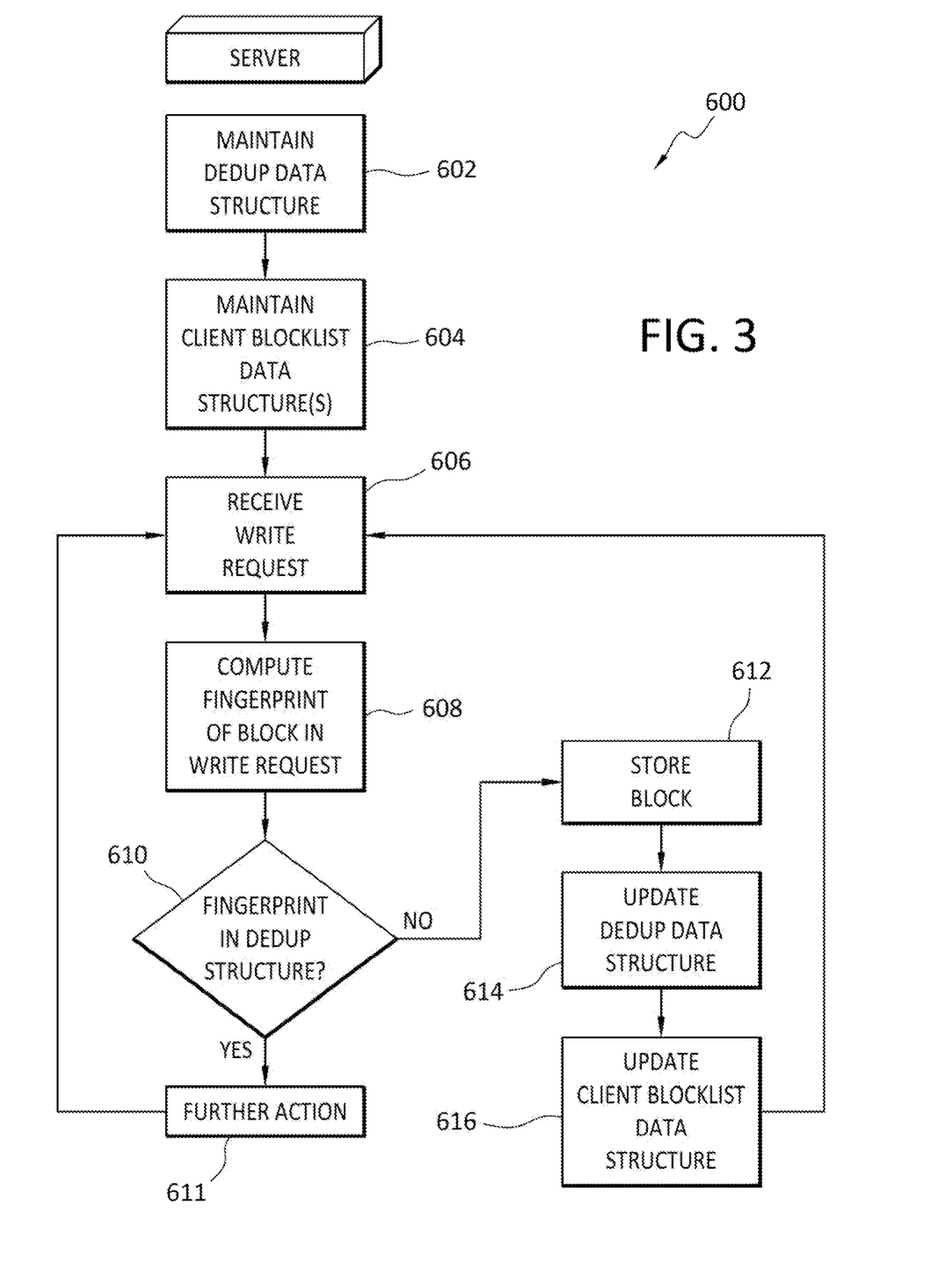
FIG. 3 discloses an example method for deduplication with retention dates.

It is noted with respect to the example method of FIG. 3 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 3, an example method is denoted generally at 600. The method 600, which may be performed in part or in whole at a server of a storage site, may involve the maintenance of a DEDUP data structure 602. The DEDUP data structure may comprise one or more entries which each identify a respective fingerprint, and a pointer to the data block from which the fingerprint was generated. The fingerprint may take the form of a hash, for example, but that is not required.

The method 600 may further involve the maintenance of a ClientBlockList data structure 604. The ClientBlockList data structure may comprise one or more entries which each identify a respective handle, retention date, and block. Particularly, the handle may be a reference or name that identifies the block, and the retention date identifies a date after which the block may be removed from storage. In some embodiments, the retention date may be assigned by a client.

A write request may be received 606 at the server that maintains the DEDUP data structure and the ClientBlockList data structure. The write request may identify, for example, a handle, retention date, and block. After receipt 606 of the write request, a fingerprint may be computed 608 for the block identified in the write request.

Next, a check may be performed to determine 610 whether or not the calculated fingerprint is already present in the DEDUP data structure. If not, the block identified in the write request may be stored 612 in storage, and an entry identifying the fingerprint and the location where the block is stored, is added 614 to the DEDUP data structure. The ClientBlockList data structure is then updated to include an entry that identifies the handle of the block that was stored 612, and also identifies the retention data and fingerprint of that block. At this point, the method may return to 606.

If it is determined at 610 that the fingerprint that was computed 608 is already present in the DEDUP data structure, no further action may be needed 611, and the method may return to 606. In some embodiments, further action may instead be taken at 611. For example, in one embodiment, the reference count would be updated in the DEDUP table. As well, in cases where the write request is for a handle 'H' that exists in the ClientBLockList, the ClientBLockList is updated.

H. Further Example Embodiments

Following are some further example embodiments of the invention. These are presented only by way of example and are not intended to limit the scope of the invention in any way.

Embodiment 1. A method, comprising: maintaining, at a server, a deduplication data structure comprising one or more entries that each identify a respective fingerprint, and pointer; maintaining, at the server, a ClientBlockList data structure comprising one or more entries that each identify a respective handle, retention date, and block; receiving, at the server, a write request that identifies a handle, retention date, and block; computing, at the server, a fingerprint of the block identified in the write request; determining, by the server, whether the fingerprint is in the deduplication data structure, and when the fingerprint is not in the deduplication data structure, storing the block identified in the write request at location 'L' in the deduplication data structure, and adding, to the deduplication data structure, an entry that identifies the fingerprint and the location 'L'; and adding, to the ClientBlockList data structure, an entry that identifies the handle, retention date, and fingerprint.

Embodiment 2. The method as recited in embodiment 1, wherein the ClientBlockList data structure is specific to a particular client, and a respective ClientBlockList data structure is maintained at the server for each of a plurality of clients.

Embodiment 3. The method as recited in any of embodiments 1-2, further comprising scanning the ClientBlockList data structure and removing any entries whose retention date has passed.

Embodiment 4. The method as recited in embodiment 3, further comprising, for a particular fingerprint 'F,' decrementing a reference count in the deduplication data structure when an entry that includes fingerprint 'F' is removed from the ClientBlockList data structure.

Embodiment 5. The method as recited in any of embodiments 1-4, wherein the deduplication data structure spans multiple client domains.

Embodiment 6. The method as recited in any of embodiments 1-5, wherein the method further comprises providing a block storage API that enables a client to specify a retention date on each block identified in a write request.

Embodiment 7. The method as recited in any of embodiments 1-6, wherein a deduplication process performed with respect to the block identified in the write request is performed without reference to the retention date of that block.

Embodiment 8. A method for performing any of the operations, methods, or processes, or any portion of any of these, disclosed herein.

Embodiment 9. A computer readable storage medium having stored therein instructions that are executable by one or more hardware processors to perform operations comprising the operations of any one or more of embodiments 1-8.

I. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
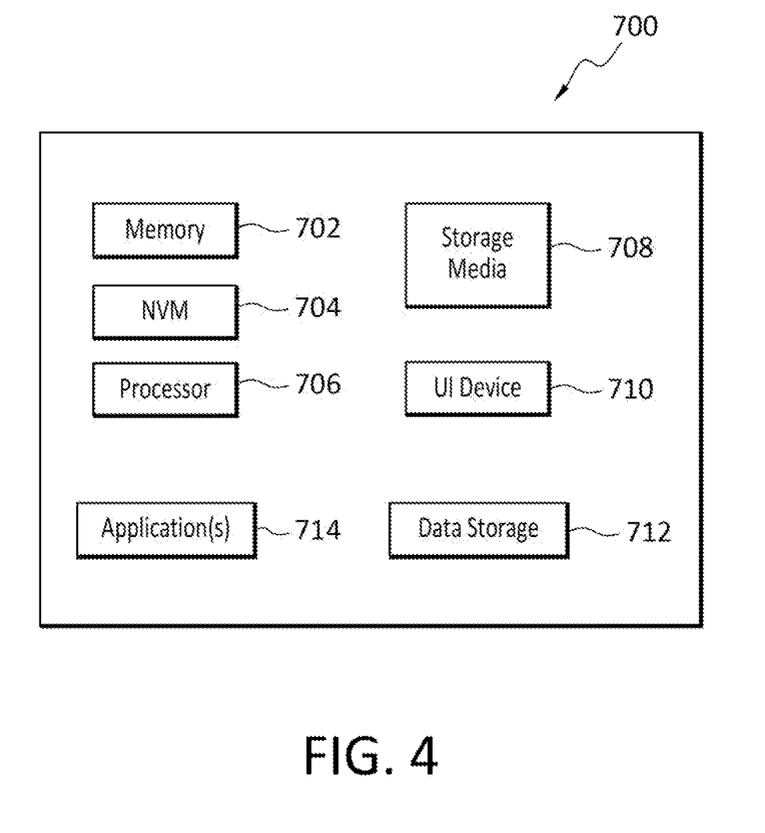
FIG. 4 discloses an example computing entity operable to perform any of the disclosed methods and processes.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 4.

In the example of FIG. 4, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, W instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   maintaining, at a server, a deduplication data structure comprising one or more entries, and each of the one or more entries comprises a respective fingerprint, and a respective pointer that points to a physical location on a disk where data associated with that fingerprint is stored;
   maintaining, at the server, a ClientBlockList data structure comprising one or more entries, and each of the entries comprises a respective handle, a respective retention date, and a respective block;
   receiving, at the server, a write request for writing a block of data, wherein the write request identifies a handle, retention date, and the block;
   computing, at the server, a fingerprint of the block identified in the write request;
   determining, by the server, whether the fingerprint of the block is in the deduplication data structure, and when the fingerprint of the block is not in the deduplication data structure, storing the block identified in the write request at a location in the deduplication data structure, and adding, to the deduplication data structure, an entry that includes the fingerprint of the block and a pointer that points to the location; and
   adding, to the ClientBlockList data structure, an entry that identifies the handle, the retention date, and the fingerprint of the block,
   wherein, when the handle is already included in an entry of the ClientBlockList data structure, the entry of the ClientBlockList data structure is overwritten by the entry that identifies the handle, the retention date, and the fingerprint of the block,
   wherein the deduplication data structure spans multiple client domains, and
   wherein a deduplication process performed with respect to the block identified in the write request is performed without reference to the retention date of that block.

2. The method as recited in claim 1, wherein the ClientBlockList data structure is specific to a particular client, and a respective ClientBlockList data structure is maintained at the server for each of a plurality of clients.

3. The method as recited in claim 1, further comprising scanning the ClientBlockList data structure and removing any entries whose retention date has passed.

4. The method as recited in claim 3, further comprising, for a particular fingerprint 'F,' decrementing a reference count in the deduplication data structure when an entry that includes fingerprint 'F' is removed from the ClientBlockList data structure.

5. The method as recited in claim 1, wherein the method further comprises providing a block storage API that enables a client to specify a retention date on each block identified in a write request.

6. A non-transitory computer readable storage medium having stored therein instructions that are executable by one or more hardware processors to perform operations comprising:

maintaining, at a server, a deduplication data structure comprising one or more entries, and each of the one or more entries comprises a respective fingerprint, and a respective pointer that points to a physical location on a disk where data associated with that fingerprint is stored;

maintaining, at the server, a ClientBlockList data structure comprising one or more entries, and each of the entries comprises a respective handle, a respective retention date, and a respective block;

receiving, at the server, a write request for writing a block of data, wherein the write request identifies a handle, retention date, and the block;

computing, at the server, a fingerprint of the block identified in the write request;

determining, by the server, whether the fingerprint of the block is in the deduplication data structure, and when the fingerprint of the block is not in the deduplication data structure, storing the block identified in the write request at a location in the deduplication data structure, and adding, to the deduplication data structure, an entry that includes the fingerprint of the block and a pointer that points to the location; and adding, to the ClientBlockList data structure, an entry that identifies the handle, the retention date, and the fingerprint of the block, wherein, when the handle is already included in an entry of the ClientBlockList data structure, the entry of the ClientBlockList data structure is overwritten by the entry that identifies the handle, the retention date, and the fingerprint of the block, wherein the deduplication data structure spans multiple client domains, and wherein a deduplication process performed with respect to the block identified in the write request is performed without reference to the retention date of that block.

7. The non-transitory computer readable storage medium as recited in claim 6, wherein the ClientBlockList data structure is specific to a particular client, and a respective ClientBlockList data structure is maintained at the server for each of a plurality of clients.

8. The non-transitory computer readable storage medium as recited in claim 6, wherein the operations further comprise scanning the ClientBlockList data structure and removing any entries whose retention date has passed.

9. The non-transitory computer readable storage medium as recited in claim 8, wherein the operations further comprise, for a particular fingerprint 'F,' decrementing a reference count in the deduplication data structure when an entry that includes fingerprint 'F' is removed from the ClientBlockList data structure.

10. The non-transitory computer readable storage medium as recited in claim 6, wherein the operations further comprise providing a block storage API that enables a client to specify a retention date on each block identified in a write request.

11. A system, comprising:
one or more hardware processors; and a non-transitory computer readable storage medium having stored therein instructions that are executable by the one or more hardware processors to perform operations comprising:

maintaining, at a server, a deduplication data structure comprising one or more entries, and each of the one or more entries comprises a respective fingerprint, and a respective pointer that points to a physical location on a disk where data associated with that fingerprint is stored;

maintaining, at the server, a ClientBlockList data structure comprising one or more entries, and each of the entries comprises a respective handle, a respective retention date, and a respective block;

receiving, at the server, a write request for writing a block of data, wherein the write request identifies a handle, retention date, and the block;

computing, at the server, a fingerprint of the block identified in the write request;

determining, by the server, whether the fingerprint of the block is in the deduplication data structure, and when the fingerprint of the block is not in the deduplication data structure, storing the block identified in the write request at a location in the deduplication data structure, and adding, to the deduplication data structure, an entry that includes the fingerprint of the block and a pointer that points to the location; and adding, to the ClientBlockList data structure, an entry that identifies the handle, the retention date, and the fingerprint, wherein, when the handle is already included in an entry of the ClientBlockList data structure, the entry of the ClientBlockList data structure is overwritten by the entry that identifies the handle, the retention date, and the fingerprint of the block, wherein the deduplication data structure spans multiple client domains, and wherein a deduplication process performed with respect to the block identified in the write request is performed without reference to the retention date of that block.

12. The system as recited in claim 11, wherein the ClientBlockList data structure is specific to a particular client, and a respective ClientBlockList data structure is maintained at the server for each of a plurality of clients.

13. The system as recited in claim 11, wherein the operations further comprise scanning the ClientBlockList data structure and removing any entries whose retention date has passed.

14. The system as recited in claim 13, wherein the operations further comprise, for a particular fingerprint 'F,' decrementing a reference count in the deduplication data structure when an entry that includes fingerprint 'F' is removed from the ClientBlockList data structure.

15. The system as recited in claim 11, wherein the operations further comprise providing a block storage API that enables a client to specify a retention date on each block identified in a write request.

* * * * *